US010406932B2

(12) United States Patent
Unno et al.

(10) Patent No.: US 10,406,932 B2
(45) Date of Patent: Sep. 10, 2019

(54) ENERGY STORAGE APPARATUS, VEHICLE APPARATUS, AND CONTROL METHOD

(71) Applicant: HONDA MOTOR CO., LTD., Tokyo (JP)

(72) Inventors: Ryota Unno, Wako (JP); Daijiro Takizawa, Wako (JP); Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 437 days.

(21) Appl. No.: 15/333,194

(22) Filed: Oct. 25, 2016

(65) Prior Publication Data

US 2017/0113564 A1 Apr. 27, 2017

(30) Foreign Application Priority Data

Oct. 27, 2015 (JP) .................................. 2015-211138

(51) Int. Cl.
*B60L 11/18* (2006.01)
*H02J 7/00* (2006.01)
(Continued)

(52) U.S. Cl.
CPC ......... *B60L 11/1861* (2013.01); *B60L 3/0046* (2013.01); *B60L 58/12* (2019.02);
(Continued)

(58) Field of Classification Search
CPC ...... B60L 11/1861; B60L 58/21; B60L 58/25; B60L 58/20; B60L 58/12; B60L 3/0046;
(Continued)

(56) References Cited

U.S. PATENT DOCUMENTS

2009/0039831 A1* 2/2009 Ichikawa ................ B60L 58/20
320/118
2015/0226811 A1* 8/2015 Shih .......................... B60L 3/12
702/63

FOREIGN PATENT DOCUMENTS

JP 2008-067523 3/2008
JP 2008-220080 9/2008
(Continued)

OTHER PUBLICATIONS

Japanese Office Action for corresponding JP Application No. 2015-211138, dated Jan. 30, 2018 (w/ machine translation).
(Continued)

*Primary Examiner* — Rexford N Barnie
*Assistant Examiner* — Terrence R Willoughby
(74) *Attorney, Agent, or Firm* — Mori & Ward, LLP

(57) ABSTRACT

A converter is to convert at least one of a first voltage output from a first energy storage device and a second voltage output from a second energy storage device. A detector is to detect the first voltage and a current flowing between the first energy storage device and the second energy storage device. Circuitry is configured to control the converter to perform a first constant current control in which a first constant current flows from one of the first energy storage device and the second energy storage device to another of the first energy storage device and the second energy storage device. The circuitry is configured to determine a state of the first energy storage device based on the first voltage and the first constant current while the first constant current control is performed.

12 Claims, 9 Drawing Sheets

(51) Int. Cl.
*B60L 3/00* (2019.01)
*B60L 58/12* (2019.01)
*B60L 58/21* (2019.01)
*B60L 58/20* (2019.01)
*B60L 58/25* (2019.01)

(52) U.S. Cl.
CPC ............... *B60L 58/20* (2019.02); *B60L 58/21* (2019.02); *B60L 58/25* (2019.02); *H02J 7/007* (2013.01); *H02J 7/0016* (2013.01); *H02J 7/0021* (2013.01); *H02J 7/0054* (2013.01); *H02J 7/0073* (2013.01); *H02J 7/0086* (2013.01); *B60L 2210/10* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2240/549* (2013.01); *Y02T 10/7005* (2013.01); *Y02T 10/7044* (2013.01); *Y02T 10/7061* (2013.01); *Y02T 10/7066* (2013.01); *Y02T 10/7216* (2013.01)

(58) Field of Classification Search
CPC .............. B60L 11/1872; B60L 2210/10; B60L 2240/526; B60L 2240/529; B60L 2240/545; B60L 2240/547; B60L 2240/549; B60L 2240/527; H02J 7/0073; H02J 7/0054; H02J 7/0086; H02J 7/007; H02J 7/0021; H02J 7/0016; Y02T 10/7216; Y02T 10/7066; Y02T 10/7005; Y02T 10/7044; Y02T 10/7061
See application file for complete search history.

(56) References Cited

FOREIGN PATENT DOCUMENTS

| JP | 2008-276970 | 11/2008 |
|---|---|---|
| JP | 2008-289270 | 11/2008 |
| JP | 2009-250270 | 10/2009 |
| JP | 2012-116257 | 6/2012 |
| JP | 2013-072862 | 4/2013 |
| JP | 2014-066556 | 4/2014 |

OTHER PUBLICATIONS

Japanese Office Action for corresponding JP Application No. 2015-211138, dated Jul. 25, 2017 (w/ English machine translation).

* cited by examiner

ENERGY STORAGE APPARATUS, VEHICLE APPARATUS, AND CONTROL METHOD

CROSS-REFERENCE TO RELATED APPLICATIONS

The present application claims priority under 35 U.S.C. § 119 to Japanese Patent Application No. 2015-211138, filed Oct. 27, 2015, entitled "Energy Storage Apparatus, Vehicle Apparatus, and Control Method." The contents of this application are incorporated herein by reference in their entirety.

BACKGROUND

1. Field

The present disclosure relates to an energy storage apparatus, a vehicle apparatus, and a control method.

2. Description of the Related Art

The related art discloses a power supply system that can estimate a state of charge (SOC) of a secondary battery even when a vehicle is traveling (see, for example, Japanese Unexamined Patent Application Publication No. 2008-276970). This power supply system has two secondary batteries, two converters, a converter ECU, and a battery ECU. The converter ECU controls two converters to charge or discharge either one of the two secondary batteries at a constant current and charge or discharge the other converter in accordance with a power requirement of a drive force generating unit. The battery ECU estimates the SOC of a secondary battery which is being charged or discharged at a constant current based on a voltage thereof.

SUMMARY

According to one aspect of the present invention, an energy storage apparatus includes a first energy storage device, a second energy storage device, a converter, a detector, and circuitry. The converter is to convert at least one of a first voltage output from the first energy storage device and a second voltage output from the second energy storage device. The detector is to detect the first voltage and a current flowing between the first energy storage device and the second energy storage device. The circuitry is configured to control the converter to perform a first constant current control in which a first constant current flows from one of the first energy storage device and the second energy storage device to another of the first energy storage device and the second energy storage device. The circuitry is configured to determine a state of the first energy storage device based on the first voltage and the first constant current while the first constant current control is performed.

According to another aspect of the present invention, an energy storage apparatus includes a first energy storage device, a second energy storage device, a converter, a detector, and circuitry. The converter is to convert at least one of a first voltage output from the first energy storage device and a second voltage output from the second energy storage device. The detector is to detect the first voltage and a current flowing between the first energy storage device and the second energy storage device. The circuitry is configured to control the converter to perform a constant current control in which a constant current flows from one of the first energy storage device and the second energy storage device to another of the first energy storage device and the second energy storage device. The circuitry is configured to determine a state of the first energy storage device based on the first voltage and the constant current while the constant current control is performed. The circuitry is configured to determine a state of the second energy storage device based on the second voltage and the constant current while the constant current control is performed.

According to further aspect of the present invention, in a control method for an energy storage apparatus, at least one of a first voltage output from a first energy storage device and a second voltage output from a second energy storage device to perform a first constant current control in which a constant current flows from one of the first energy storage device and the second energy storage device to another of the first energy storage device and the second energy storage device. The first voltage and the constant current flowing between the first energy storage device and the second energy storage device is detected. A state of the first energy storage device is determined based on the first voltage and the constant current while the first constant current control is performed.

According to further aspect of the present invention, in a control method for an energy storage apparatus, at least one of a first voltage output from a first energy storage device and a second voltage output from a second energy storage device to perform a constant current control in which a constant current flows from one of the first energy storage device and the second energy storage device to another of the first energy storage device and the second energy storage device. The first voltage and the constant current flowing between the first energy storage device and the second energy storage device is detected. A state of the first energy storage device is determined based on the first voltage and the constant current while the constant current control is performed. A state of the second energy storage device is determined based on the second voltage and the constant current while the constant current control is performed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
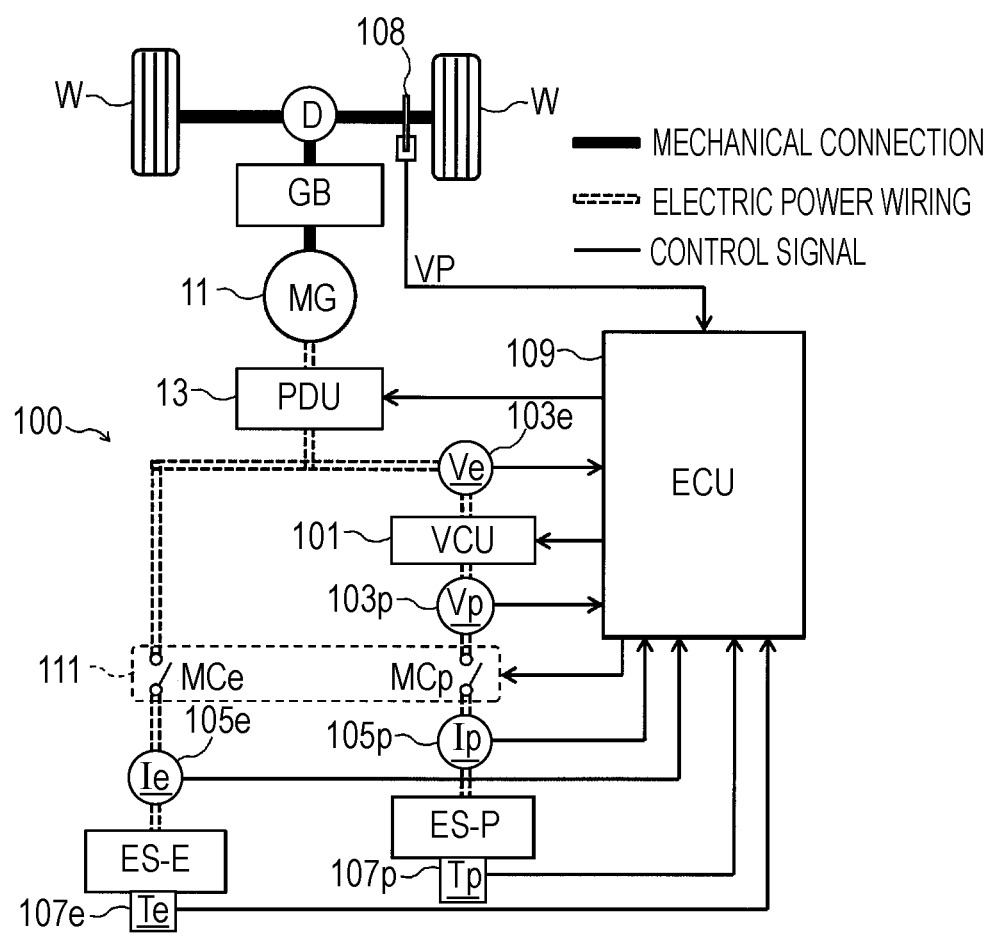
FIG. 1 is a block diagram illustrating a general configuration of an electromotive vehicle in which an energy storage apparatus of one embodiment according to the present disclosure is mounted.

The embodiments will now be described with reference to the accompanying drawings, wherein like reference numerals designate corresponding or identical elements throughout the various drawings.

FIG. 1 a block diagram illustrating a general configuration of an electromotive vehicle in which an energy storage apparatus of one embodiment according to the present disclosure is mounted. In FIG. 1, bold solid lines represent mechanical connections, double-dotted lines represent power wiring, and thin solid lines represent control signals. A 1MOT type electromotive vehicle illustrated in FIG. 1 has a motor generator (MG) 11, a power drive unit (PDU) 13, and an energy storage apparatus 100 of an embodiment. Respective components of the electromotive vehicle will be described below.

The motor generator 11 is driven by electric power supplied from the energy storage apparatus 100 and generates a motive force with which the electromotive vehicle moves. Torque generated by the motor generator 11 is transferred to a drive wheel W via a gear box GB and a differential gear D that include variable gears and fixed gears. Further, when reducing the speed of the electromotive vehicle, the motor generator 11 operates as a power generator to output a breaking force of the electromotive vehicle. Note that regenerative electric power generated by the motor generator 11 operating as a power generator is stored in a battery of the energy storage apparatus 100.

The PDU 13 converts a direct current (DC) voltage into an alternating current (AC) voltage and supplies a three-phase current to the motor generator 11. Further, the PDU 13 converts, into a DC voltage, an AC voltage that is input during a regenerative operation of the motor generator 11.

As illustrated in FIG. 1, the energy storage apparatus 100 has a high capacity battery ES-E (a first energy storage device or a second energy storage device), a high power battery ES-P (a second energy storage device or a first energy storage device), a voltage control unit (VCU) 101 (a converter 101), voltage sensors 103p and 103e, current sensors 105p and 105e, temperature sensors 107p and 107e, a vehicle speed sensor 108, a switch unit 111, and an electronic control unit (ECU) 109 (circuitry 109). The voltage sensors 103p and 103e, and the current sensors 105p and 105e can be referred to as a detector.

The high capacity battery ES-E has a plurality of energy storage cells such as a lithium ion battery, a nickel hydrogen battery, or the like and supplies high voltage electric power to the motor generator 11. The high power battery ES-P also has a plurality of energy storage cells such as a lithium ion battery, a nickel hydrogen battery, or the like and supplies high voltage electric power to the motor generator 11 via the VCU 101. The high power battery ES-P is connected to the PDU 13 via the VCU 101 in parallel with the high capacity battery ES-E. Further, in general, the voltage of the high power battery ES-P is lower than the voltage of the high capacity battery ES-E. Therefore, electric power of the high power battery ES-P is stepped up by the VCU 101 to the same level as the voltage of the high capacity battery ES-E and then supplied to the motor generator 11 via the PDU 13.

Note that the high capacity battery ES-E and/or the high power battery ES-P is not limited to a secondary battery such as a nickel hydrogen battery or a lithium ion battery described above. For example, although having a lower chargeable capacity, a capacitor that enables charging or discharging with a large amount of electric power within a short time may be used as the high power battery ES-P.

Further, the characteristics of the high capacity battery ES-E and the characteristics of the high power battery ES-P are different from each other. While the high capacity battery ES-E has a lower output weight density than that of the high power battery ES-P, the high capacity battery ES-E has a higher energy weight density than that of the high power battery ES-P. On the other hand, while the high power battery ES-P has a lower energy weight density than that of the high capacity battery ES-S, the high power battery ES-P has a higher output weight density than that of the high capacity battery ES-S. In such a way, the high capacity battery ES-E is relatively superior in energy weight density, and the high power battery ES-P is relatively superior in output weight density. Note that the energy weight density refers to electric energy per unit weight (Wh/kg) and the output weight density refers to electric power per unit weight (W/kg). Therefore, the high capacity battery ES-E that is superior in energy weight density is an energy storage device that is primarily intended to have a high capacity, and the high power battery ES-P that is superior in output weight density is an energy storage device that is primarily intended to have high power.

Such a difference in the characteristics between the high capacity battery ES-E and the high power battery ES-P is due to various parameters resulting from the structure and/or the material and the like, such as electrodes, an active material, an electrolyte/liquid, or the like of the battery. For example, the high capacity battery ES-E is superior to the high power battery ES-P in chargeable capacity, which is a parameter representing the total amount of chargeable and dischargeable electricity. In contrast, the high power battery ES-P is superior to the high capacity battery ES-S in C rate characteristics, which are a parameter denoting anti-deterioration of a chargeable capacity against charging and discharging, and/or an internal resistance (impedance), which is a parameter denoting an electric resistance against charging and discharging.

The VCU 101 steps up the output voltage of the high power battery ES-P as a DC voltage without conversion. Further, the VCU 101 steps down the voltage of electric power that is generated by the motor generator 11 and DC-converted when the speed of the electromotive vehicle is reduced. Furthermore, the VCU 101 steps down the output voltage of the high capacity battery ES-E as a DC voltage without conversion. The high power battery ES-P is charged with the electric power whose voltage has been stepped down by the VCU 101. Note that a voltage level or a current level of the DC electric power output by the VCU 101 is controlled by the ECU 109.

The voltage sensor 103p detects a voltage Vp of the high power battery ES-P. A signal indicating the voltage Vp detected by the voltage sensor 103p is transmitted to the ECU 109. The voltage sensor 103e detects a voltage Ve of the high capacity battery ES-E. Note that the voltage Ve detected by the voltage sensor 103e is equal to a value that is stepped up by the VCU 101 from the voltage Vp of the high power battery ES-P. A signal indicating the voltage Ve detected by the voltage sensor 103e is transmitted to the ECU 109.

The current sensor 105p detects an input/output current Ip of the high power battery ES-P. A signal indicating the input/output current Ip detected by the current sensor 105p is transmitted to the ECU 109. The current sensor 105e detects an input/output current Ie of the high capacity battery ES-E. A signal indicating the input/output current Ie detected by the current sensor 105e is transmitted to the ECU 109.

The temperature sensor 107p detects a temperature Tp of the high power battery ES-P. A signal indicating the temperature Tp detected by the temperature sensor 107p is transmitted to the ECU 109. The temperature sensor 107e detects a temperature Te of the high capacity battery ES-E. A signal indicating the temperature Te detected by the temperature sensor 107e is transmitted to the ECU 109.

The vehicle speed sensor 108 detects a traveling speed (a vehicle speed) VP of the electromotive vehicle. A signal indicating the vehicle speed VP detected by the vehicle speed sensor 108 is transmitted to the ECU 109.

The switch unit 111 has a conductor MCe that connects and disconnects a current path from the high capacity battery ES-E to the PDU 13 or the VCU 101 and a conductor MCp that connects and disconnects a current path from the high power battery ES-P to the VCU 101. Each of the conductors MCe and MCp is controlled to be opened and closed by the ECU 109.

The ECU 109 controls the PDU 13 and the VCU 101 and controls the switch unit 111 to be opened or closed. Further, the ECU 109 determines a traveling state of the electromotive vehicle based on the vehicle speed VP indicated by a signal obtained from the vehicle speed sensor 108. Further, in a state where the electromotive vehicle stops, the ECU 109 performs a constant current control that controls the VCU 101 such that a constant current flows from one of the high capacity battery ES-E and the high power battery ES-P to the other, and determines each state of the high capacity battery ES-E and the high power battery ES-P based on the voltage Ve of the high capacity battery ES-E and the voltage Vp of the high power battery ES-P obtained in the constant current control and on the constant current conducted in the constant current control.

Figure 2:
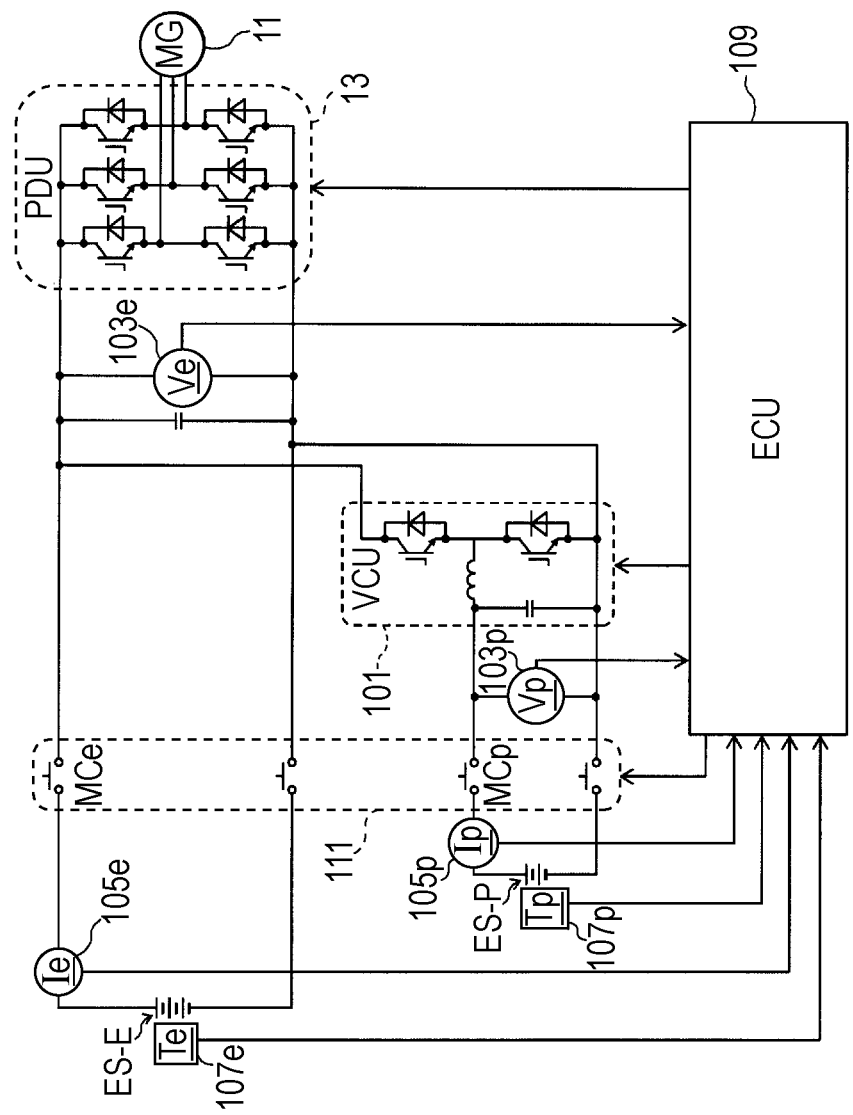
FIG. 2 is an electric circuit diagram illustrating a relationship between a high capacity battery, a high power battery, a VCU, a PDU, and a motor generator.

FIG. 2 is an electric circuit diagram illustrating a relationship among the high capacity battery ES-E, the high power battery ES-P, the VCU 101, the PDU 13, and the motor generator 11. As illustrated in FIG. 2, the VCU 101 is input with the output voltage of the high power battery ES-P as an input voltage and switches on and off two switching elements alternately to step up the voltage of the high power battery ES-P and output the stepped up voltage. When these two switching elements are not alternately switched on and off and, instead, the switching element of a high-side arm is held in an on-state and the switching element of a low-side arm is held in an off-state, the high power battery ES-P is directly connected to the high capacity battery ES-E and the PDU 13 in view of an electric system. Further, as described above, since the voltage of the high power battery ES-P is lower than the voltage of the high capacity battery ES-E in general, with both of two switching elements of the VCU 101 being switched off, the high power battery ES-P is in a state of an open circuit. Further, the PDU 13 is input with the output voltage of the high capacity battery ES-E as an input voltage and switches on and off alternately and sequentially six switching elements to convert a DC voltage into an AC voltage and output the AC voltage to the motor generator 11.

When these six switching elements are not alternately and sequentially switched on and off and, instead, all the switching elements are held in an off-state, the high capacity battery ES-E and the high power battery ES-P are separated from the motor generator 11 in view of an electric system.

In such a way, when the electromotive vehicle stops and it is unnecessary to drive the motor generator 11, the ECU 109 controls the PDU 13 to switch off all the six switching elements of the PDU 13 and controls the VCU 101 to switch off both two switching elements of the VCU 101. According to this switching operation, in a state where the voltage Ve of the high capacity battery ES-E is higher than the voltage Vp of the high power battery ES-P, the high capacity battery ES-E and the high power battery ES-P are not charged or discharged, that is, each of the high capacity battery ES-E and the high power battery ES-P is in a state of an open circuit. In this state, when the ECU 109 switches on only the switching element of the high-side arm of the VCU 101, the high capacity battery ES-E and the high power battery ES-P are directly connected in view of an electric system.

Figure 3:
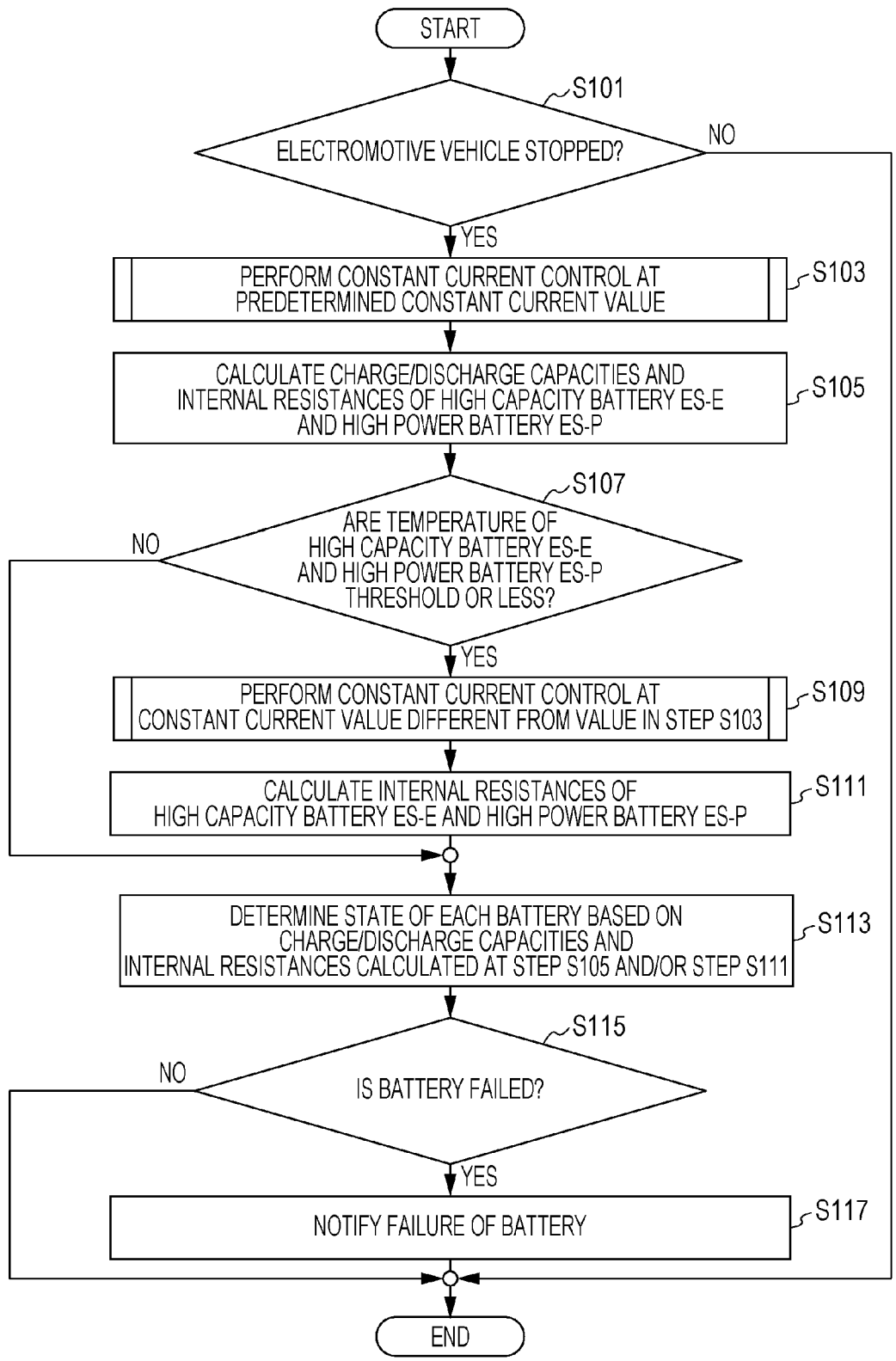
FIG. 3 is a flowchart illustrating a process flow when an ECU performs constant current control to determine each state of the high capacity battery and the high power battery.
Figure 4:
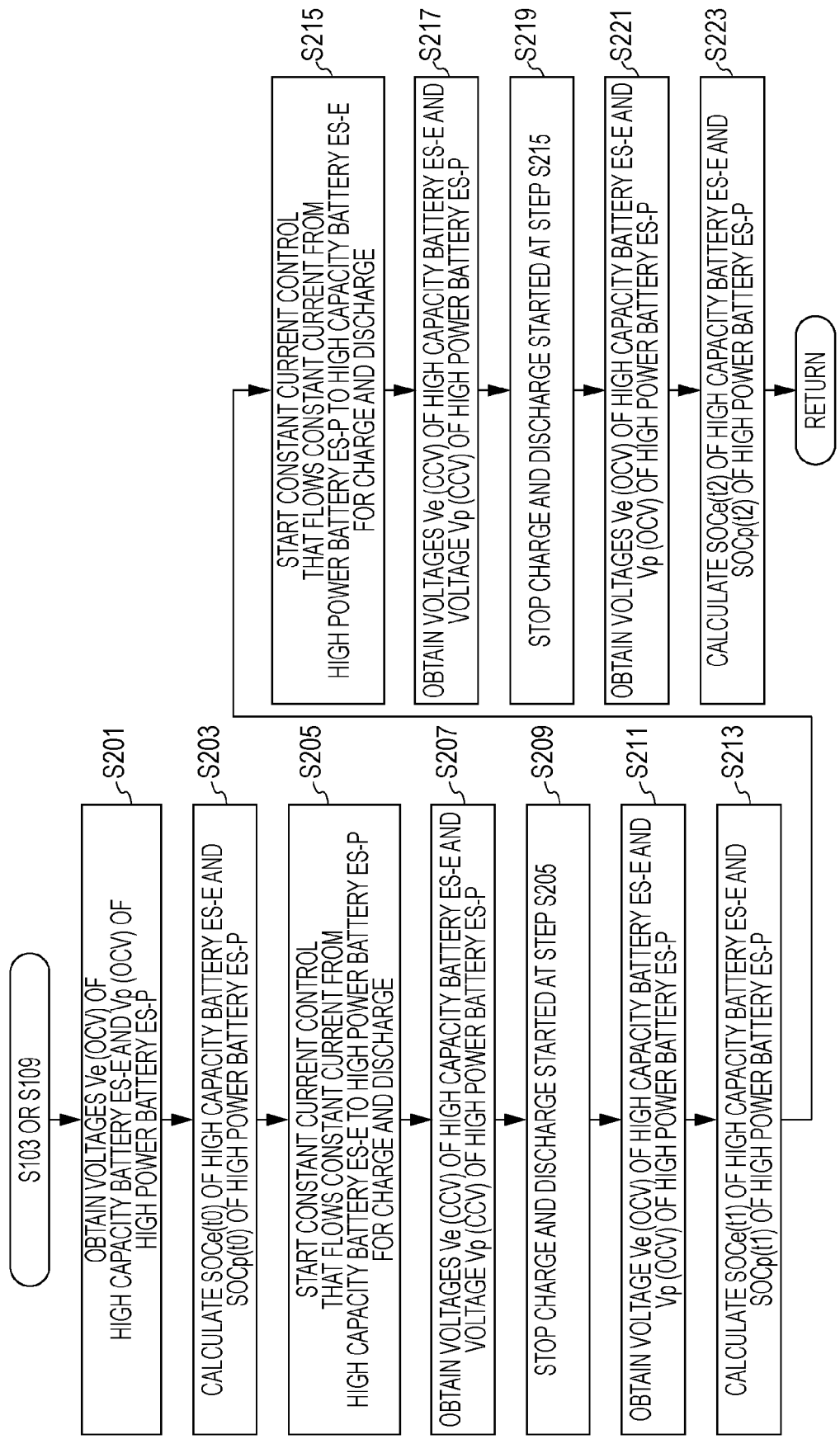
FIG. 4 is a flowchart illustrating a process flow of a subroutine performed at steps S103 and S109 of FIG. 3.

A process when the ECU 109 performs constant current control and determines each state of the high capacity battery ES-E and the high power battery ES-P will be described in detail below with reference to FIG. 3 and FIG. 4. FIG. 3 is a flowchart illustrating a process flow when the ECU 109 performs constant current control to determine each state of the high capacity battery ES-E and the high power battery ES-P. FIG. 4 is a flowchart illustrating a process flow of a subroutine performed at steps S103 and S109 of FIG. 3.

As illustrated in FIG. 3, the ECU 109 determines whether or not the electromotive vehicle is stopped based on the vehicle speed VP indicated by a signal obtained from the vehicle speed sensor 108 (step S101), and enters step S103 if the electromotive vehicle is stopped, or terminates a series of operations if the electromotive vehicle is traveling. At step S103, the ECU 109 performs a subroutine illustrated in FIG. 4 that performs constant current control which conducts a relatively small constant current from one of the high capacity battery ES-E and the high power battery ES-P to the other.

Figure 5:
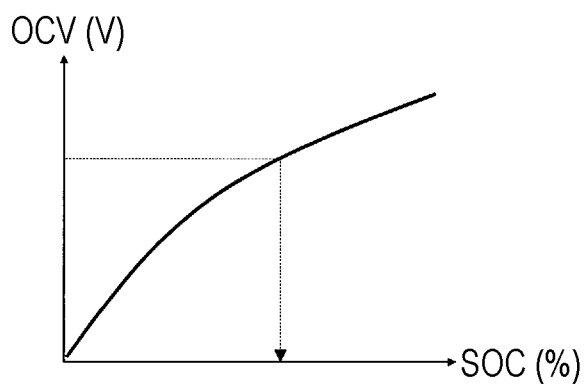
FIG. 5 is a diagram illustrating a relationship between an OCV and an SOC of the high capacity battery and the high power battery.

In the subroutine illustrated in FIG. 4, the ECU 109 acquires the voltage Ve of the high capacity battery ES-E detected by the voltage sensor 103e and the voltage Vp of the high power battery ES-P detected by the voltage sensor 103p (step S201). At time t0 of step S201, since both of the high capacity battery ES-E and the high power battery ES-P are opened, the voltages Ve and Vp each are equal to an open circuit voltage (OCV). Since there is a relationship as illustrated in FIG. 5 between the OCV and the state of charge (SOC) of the high capacity battery ES-E and the high power battery ES-P, the ECU 109 calculates a state of charge SOCe of the high capacity battery ES-E in accordance with the voltage Ve (OCVe1) obtained at step S201 and calculates a state of charge SOCp of the high power battery ES-P in accordance with the voltage Vp (OCVp1) obtained at step S201 (step S203).

Figure 6:
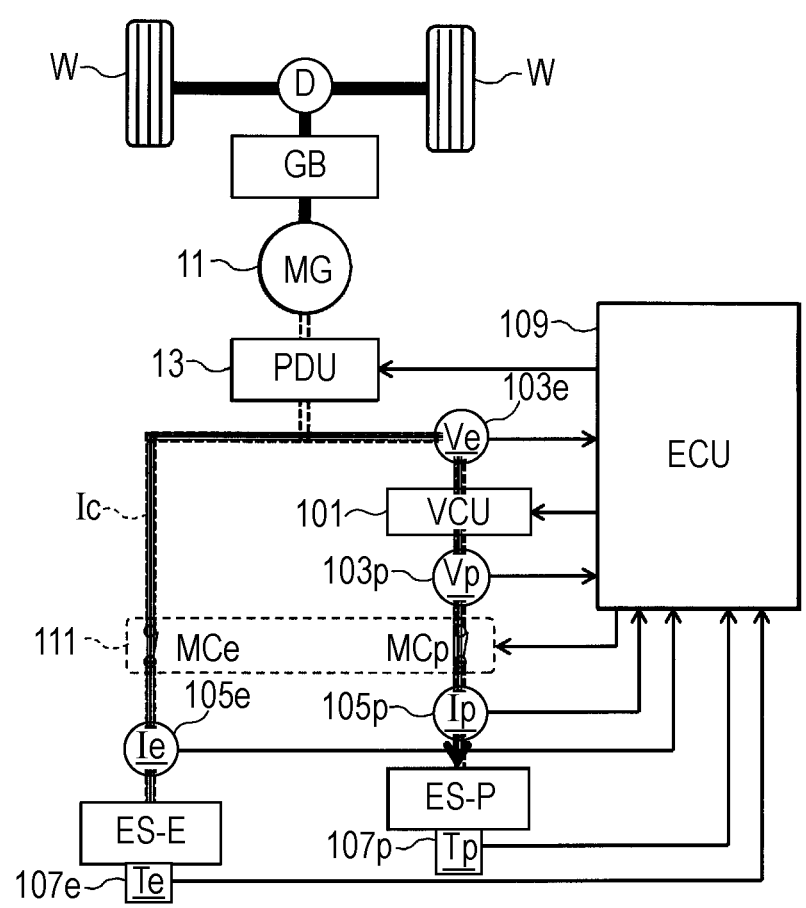
FIG. 6 is a diagram illustrating a flow of a constant current from the high capacity battery to the high power battery during constant current control.

Next, as illustrated in FIG. 6, the ECU 109 controls the VCU 101 so as to start constant current control that conducts a constant current Ic from the high capacity battery ES-E to the high power battery ES-P to charge and discharge the batteries (step S205). Next, the ECU 109 obtains the voltage Ve of the high capacity battery ES-E detected by the voltage sensor 103e during charging or discharging thereof and the voltage Vp of the high power battery ES-P detected by the voltage sensor 103p during charging or discharging thereof (step S207). At the time of step S207, since each of the high capacity battery ES-P and the high power battery ES-P has a load, the voltages Ve and Vp are equal to a closed circuit voltage (CCV).

Next, the ECU 109 controls the VCU 101 so as to stop the constant current control started at step S205 (step S209). Next, the ECU 109 obtains the voltage Ve of the high capacity battery ES-E detected by the voltage sensor 103e and the voltage Vp of the high power battery ES-P detected by the voltage sensor 103p (step S211). At time t1 (later than the time t0) of step S211, since the charging and discharging of the batteries are stopped and thus both the high capacity battery ES-E and the high power battery ES-P are opened, the voltages Ve and Vp are equal to the OCV. The ECU 109 calculates a state of charge SOCe (t1) of the high capacity battery ES-E in accordance with the voltage Ve (OCVe2) obtained at step S211 and calculates a state of charge SOCp (t1) of the high power battery ES-P in accordance with the voltage Vp (OCVp2) obtained at step S211 (step S213).

Figure 7:
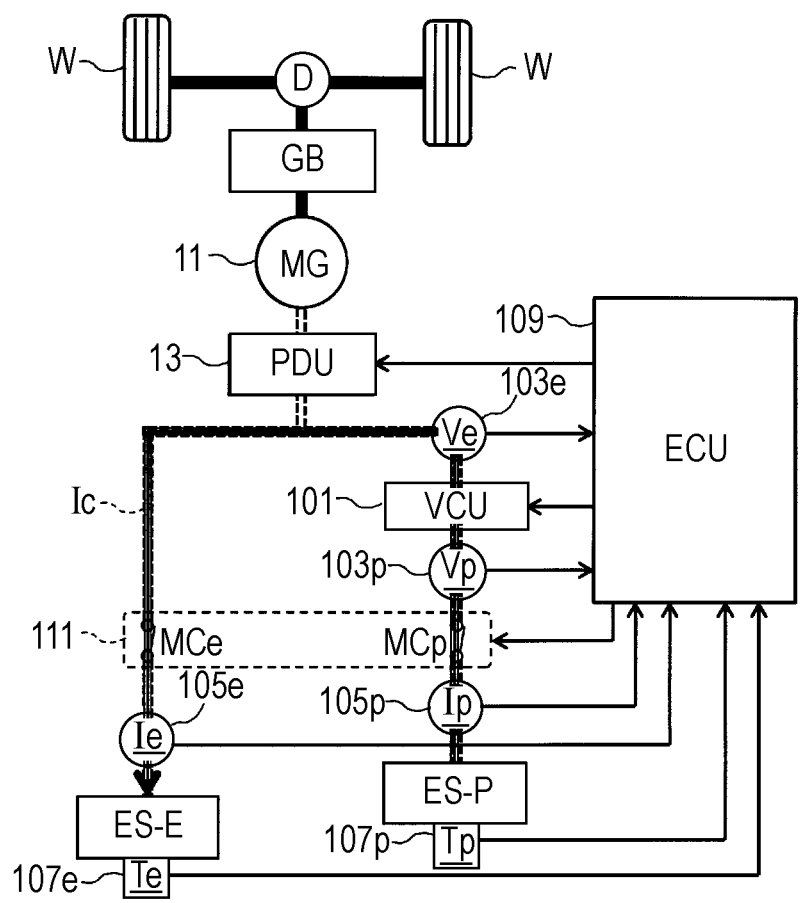
FIG. 7 is a diagram illustrating a flow of a constant current from the high power battery to the high capacity battery during constant current control.

Next, as illustrated in FIG. 7, the ECU 109 controls the VCU 101 so as to start constant current control that conducts the constant current Ic from the high power battery ES-P to the high capacity battery ES-E to charge and discharge the batteries (step S215). Note that the value of a constant current conducted at step S215 may be the same as or different from a value of the constant current conducted at step S205. Further, the value of the constant current conducted at step S215 may be set such that the SOC of the high power battery ES-P is included in a middle range of 40% to 70%. Because deterioration of the high power battery ES-P is likely to be facilitated when the SOC is out of the middle range, the value of the constant current described above is preferably set taking into consideration of deterioration of the high power battery ES-P.

Next, the ECU 109 obtains the voltage Ve of the high capacity battery ES-P detected by the voltage sensor 103e during charging or discharging thereof and the voltage Vp of the high power battery ES-P detected by the voltage sensor 103p during charging or discharging thereof (step S217). At the time of step S217, since each of the high capacity battery ES-P and the high power battery ES-P has a load, the voltages Ve and Vp are equal to the CCV.

Next, the ECU 109 controls the VCU 101 so as to stop the constant current control started at step S215 (step S219). Next, the ECU 109 obtains the voltage Ve of the high capacity battery ES-E detected by the voltage sensor 103e and the voltage Vp of the high power battery ES-P detected by the voltage sensor 103p (step S221). At time t2 (later than the time t1) of step S221, since the charging and discharging of the batteries are stopped and thus both the high capacity battery ES-E and the high power battery ES-P are opened, the voltages Ve and Vp are equal to the OCV. The ECU 109 calculates a state of charge SOCe (t2) of the high capacity battery ES-E in accordance with the voltage Ve (OCVe3) obtained at step S221 and calculates a state of charge SOCp (t2) of the high power battery ES-P in accordance with the voltage Vp (OCVp2) obtained at step S221 (step S223).

Next, after performing step S103 including the subroutine illustrated in FIG. 4, the ECU 109 calculates the charge/discharge capacities and the internal resistances of the high capacity battery ES-E and the high power battery ES—P based on the parameters obtained at step S103 (step S105). A charge or discharge capacity C (a capacity C) is calculated by using the following Equation (1). Further, an internal resistance of each battery is calculated by using the following Equation (2).

$$C = \frac{\Delta Ah}{\Delta SOC} = \frac{Ic \times \Delta t}{SOC(t+\Delta t) - SOC(t)} \quad (1)$$

Value Δt is the duration of charging or discharging of a battery by constant current control. Term SOC(t) is the SOC of a battery immediately before charging or discharging by the constant current control, and term SOC(t+Δt) is the SOC of a battery immediately after charging or discharging by the constant current control. Value Ic is a constant value of the current flowing between the batteries during the charging or the discharging by the constant current control.

$$R = \frac{OCV - CCV}{Ic} \quad (2)$$

Value OCV is a battery voltage detected immediately before or immediately after charging or discharging by constant current control, that is, an open circuit voltage. Value CCV is a battery voltage detected during charging or discharging by the constant current control, that is, a closed circuit voltage. Value Ic is a constant value of the current flowing between the batteries during the charging or the discharging by the constant current control.

Figure 8A:
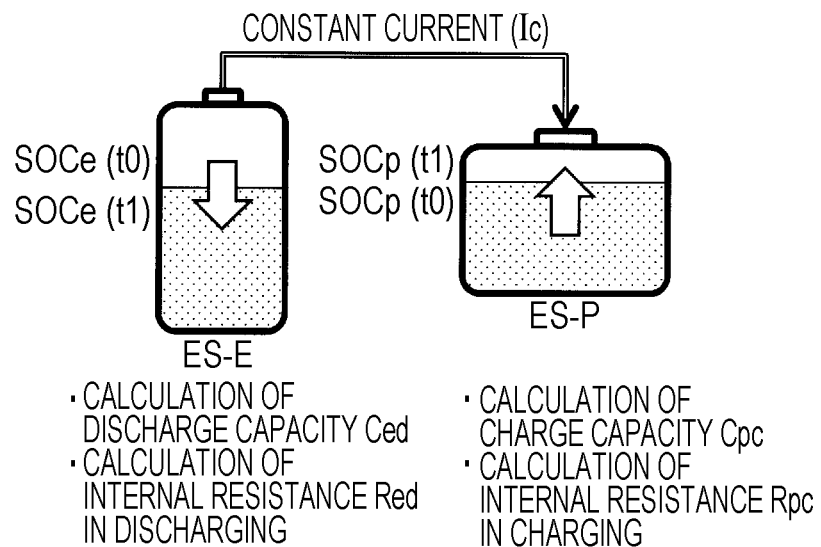
FIG. 8A is a diagram illustrating a change in the SOC of each battery and calculation of charge/discharge capacities and internal resistances when a constant current flows from the high capacity battery to the high power battery during constant current control.
Figure 8B:
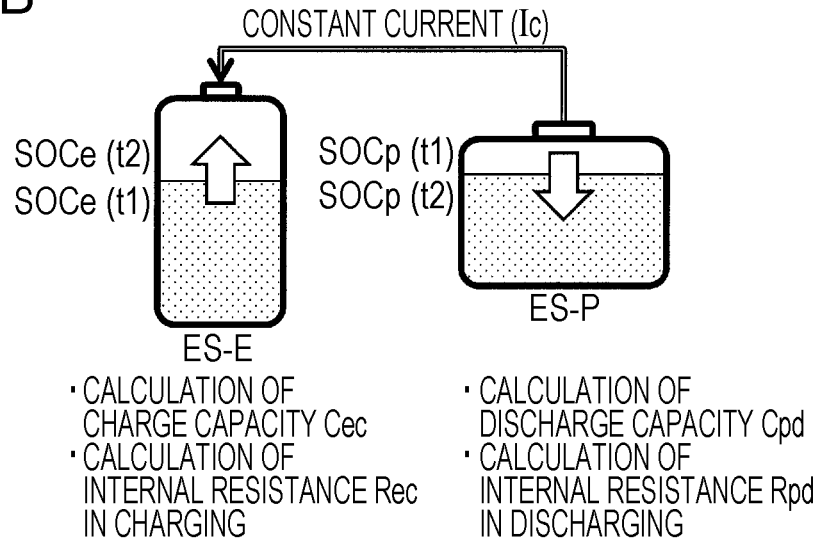
FIG. 8B is a diagram illustrating a change in the SOC of each battery and calculation of charge/discharge capacities and internal resistances when a constant current flows from the high power battery to the high capacity battery during constant current control.

The charge/discharge capacity and the internal resistance calculated at step S105 by using Equation (1) and Equation (2) are calculated separately during discharging of each battery and during charging of each battery. That is, as illustrated in FIG. 8A, based on the parameters obtained when the constant current Ic flows from the high capacity battery ES-E to the high power battery ES-P (steps S201 to S203 illustrated in FIG. 4), the ECU 109 calculates a discharge capacity Ced of the high capacity battery ES-E, an internal resistance Red of the high capacity battery ES-E during discharging, a charge capacity Cpc of the high power battery ES-P, and an internal resistance Rpc of the high power battery ES-P during charging. Further, as illustrated in FIG. 8B, based on the parameters obtained when the constant current Ic flows from the high power battery ES-P to the high capacity battery ES-E (steps S211 to S213 illustrated in FIG. 4), the ECU 109 calculates a discharge capacity Cpd of the high power battery ES-P, an internal resistance Rpd of the high power battery ES-P during discharging, a charge capacity Cec of the high capacity battery ES-E, and an internal resistance Rec of the high capacity battery ES-E during charging.

Next, the ECU 109 determines whether or not the temperature Te of the high capacity battery ES-E detected by the temperature sensor 107e or the temperature Tp of the high power battery ES-P detected by the temperature sensor 107p is less than or equal to a threshold. The ECU 109 enters step S109 if the temperature Te or the temperature Tp is less than or equal to the threshold, or enters step S113 if both of the temperature Te and the temperature Tp exceed the threshold. At step S109, the ECU 109 performs the same process as step S103 that performs constant current control conducting a constant current from one of the high capacity battery ES-E and the high power battery ES-P to the other. However, the constant current flowing between the batteries at step S109 is different in the value from the constant current flowing between the batteries at step S103. The ECU 109 calculates internal resistances of the high capacity battery ES-E and the high power battery ES-P in the same manner as in step S105 based on the parameters obtained at step S109 (step S111).

At step S113, the ECU 109 determines each battery state based on the charge/discharge capacities and the internal resistances of the high capacity battery ES-E and the high power battery ES-P calculated at step S105. Note that, when steps S109 and S111 are performed, the ECU 109 determines each battery state based also on the internal resistances of the high capacity battery ES-E and the high power battery ES-P calculated at step S105.

Next, based on each battery state determined at step S113, the ECU 109 determines whether or not there is a failed battery (step S115). Note that a failure state of a battery can be determined when the internal resistance is higher than or equal to a threshold and/or when the charge/discharge capacity is less than or equal to a threshold, for example. The ECU 109 enters step S117 if it is determined that there is a failed battery at step S115, or it is determined that a series of operations when determining there is no failed battery. At step S117, the ECU 109 notifies that a battery is failed.

As described above, according to the present embodiment, constant current control that controls the VCU 101 such that a constant current flows from one of the high capacity battery ES-E and the high power battery ES-P to the other is performed to determine each state of the high capacity battery ES-E and the high power battery ES—P based on each battery voltage and the constant current obtained during the constant current control, which allows for determination of each battery state by using the single VCU 101 only. Further, since the constant current control is performed by charging or discharging with a constant current between the high capacity battery ES-E and the high power battery ES-P, there is no indirect constraint on the constant current due to a required drive force as seen in the related art described before. This allows for a highly accurate detection accuracy of the voltage Ve of the high capacity battery ES-E and the voltage Vp of the high power battery ES-P obtained when the constant current control is performed. Therefore, each state of the high capacity battery ES-E and the high power battery ES-P can be determined in a highly accurate manner.

Further, since capacities and internal resistances of respective batteries are calculated based on the accurate detection voltages of the high capacity battery ES-E and the high power battery ES-P obtained when the constant current control is performed, each state of the high capacity battery ES-E and the high power battery ES-P can be accurately determined based on the capacities and the internal resistances.

Further, even when the high capacity battery ES-E or the high power battery ES-P is at a low temperature and the characteristics of the internal resistance for a charge or discharge current of the battery are not linear, since the constant current control is performed multiple times with different values of the current, a state of the battery at a low temperature can be accurately determined based on the multiple internal resistances.

Further, constant current control that controls the VCU 101 such that a constant current flows between the high capacity battery ES-E and the high power battery ES-P is performed not only in the form in which a constant current flows from the high capacity battery ES-E to the high power battery ES-P but also in the form in which a current flows from the high power battery ES-P to the high capacity battery ES-E. Thus, deterioration of each battery can be suppressed because the SOC of each battery after the constant current control is close to the SOC before the constant current control, and more accurate values of the voltage Ve of the high capacity battery ES-E and the voltage Vp of the high power battery ES-P can be obtained because both charging and discharging are used for the detection. Therefore, each state of the high capacity battery ES-E and the high power battery ES-P can be more accurately determined.

Further, each of the voltage Ve of the high capacity battery ES-E and the voltage Vp of the high power battery ES-P is detected in both cases of one of the batteries being in the side of discharging a constant current and being in the side of charging a constant current in the constant current control, and both of the charge capacity and the discharge capacity of each battery and both of the internal resistance against charging and the internal resistance against discharging of each battery are calculated. Therefore, each state of the high capacity battery ES-E and the high power battery ES-P can be more accurately determined.

Note that the present disclosure is not limited to the embodiment described above, and modifications, alterations, and the like are possible as appropriate. For example, while being a 1MOT-type electrical vehicle (EV), the electromotive vehicle described above may be an EV in which a plurality of motor generators are mounted, a hybrid Electrical vehicle (HEV) or a plug-in hybrid electrical vehicle (PHEV) in which at least one motor generator and an internal combustion engine are mounted, or a fuel cell vehicle (FCV).

Figure 9:
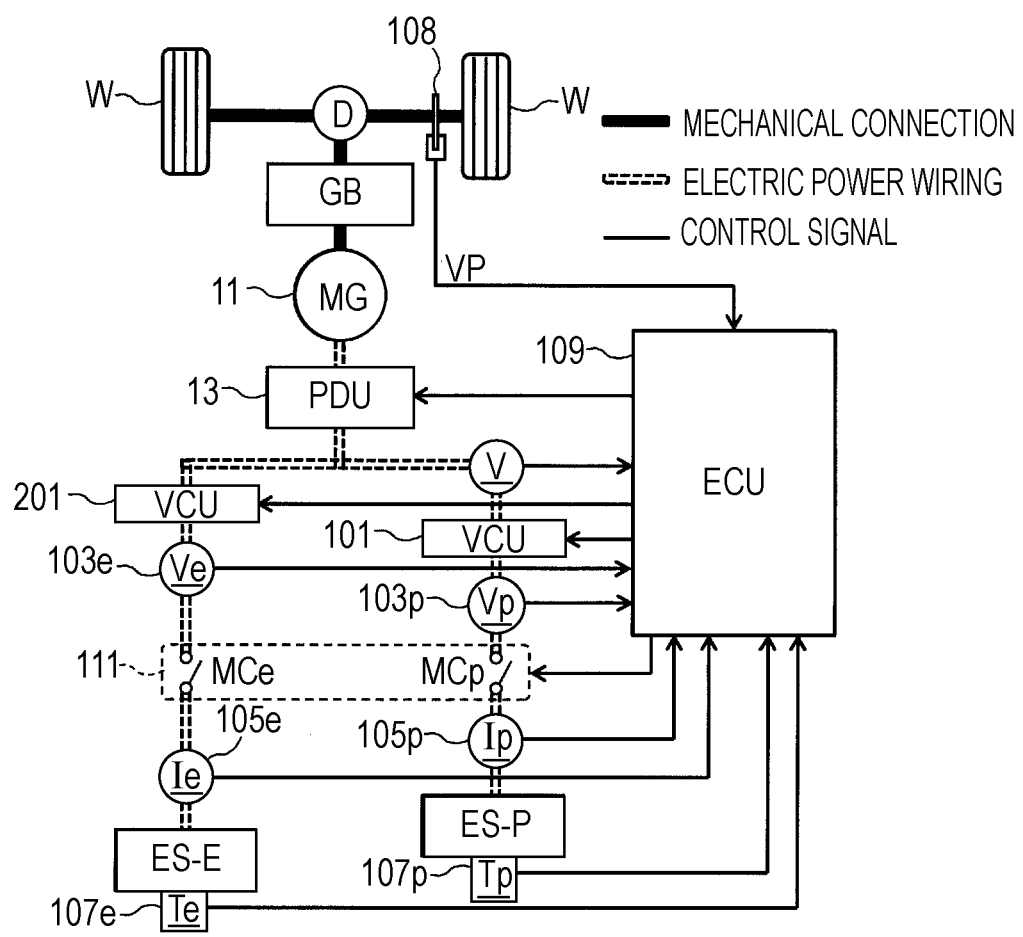
FIG. 9 is a block diagram illustrating a general configuration of an electromotive vehicle in which an energy storage apparatus of another embodiment is mounted.

Although the VCU 101 of the present embodiment steps up the voltage Vp of the high power battery ES-P, a VCU that steps down the voltage Vp of the high power battery ES-P will be used when the voltage Ve of the high capacity battery ES-E is lower than the voltage Vp of the high power battery ES-P. Further, a VCU that can step up and step down a voltage in both directions may be used. Further, as illustrated in FIG. 9, a VCU 201 may be provided in the side of the high capacity battery ES-E. When two VCUs are provided, a voltage applied to the motor generator 11 and the PDU 13 is not restricted by the high capacity battery ES-E and thus the efficiency is improved.

Even when two VCUs 101 and 201 described above are provided as illustrated in FIG. 9, the constant current control can be performed at either one of the VCUs.

Further, as another embodiment, when a failure diagnosis of a battery is performed at step S115 in FIG. 3, other parameters than the threshold pre-stored in the ECU 109 may be used as a value to be compared to a calculated internal resistance and/or a charge/discharge capacity. For example, since a charge capacity and a discharge capacity are equal to each other in general, both of these capacities may be compared to each other and, when a difference thereof is greater than or equal to a threshold, it can be determined that the battery is failed. Otherwise, a failure diagnosis may be performed by using a comparison to a previous value. Furthermore, a failure diagnosis may be performed based on a combination of the above technologies, which allows the diagnosis accuracy to be enhanced to the limit.

Further, in the above description, when the electromotive vehicle stops and it is unnecessary to drive the motor generator 11, the ECU 109 controls the PDU 13 such that all the six switching elements of the PDU 13 are switched off and controls the VCU 101 such that both two switching elements of the VCU 101 are switched off to have an open circuit state of the high capacity battery ES-E and the high power battery ES-P. However, the ECU 109 may control the conductors MCe and MCp of the switch unit 111 to be opened to have an open circuit state of each battery.

A first aspect of the embodiment is an energy storage apparatus including: a first energy storage device (for example, a high capacity battery ES-E or a high power battery ES-P in the embodiment described later); a second energy storage device (for example, a high power battery ES-P or a high capacity battery ES-E in the embodiment described later); a conversion unit (for example, a VCU 101 in the embodiment described later) configured to convert at least one of an output voltage of the first energy storage device and an output voltage of the second energy storage device; a detection unit (for example, a voltage sensor 103p or a voltage sensor 103e and a current sensor 105p and/or a current sensor 105e in the embodiment described later) configured to detect a voltage of the first energy storage device and a current flowing between the first energy storage device and the second energy storage device; and a control unit (for example, an ECU 109 in the embodiment described later) configured to control the conversion unit. The control unit performs first constant current control that controls the conversion unit such that a constant current flows from one of the first energy storage device and the second energy storage device to another of the first energy storage device and the second energy storage device, and determines a state of the first energy storage device based on the voltage of the first energy storage device and the constant current obtained during the constant current control.

In a second aspect of the embodiment according to the first aspect, the control unit may calculate a capacity of the first energy storage device based on a difference between a state of charge of the first energy storage device corresponding to an open circuit voltage of the first energy storage device obtained before the first constant current control and a state of charge of the first energy storage device corresponding to an open circuit voltage obtained after the first constant current control and based on the value of the constant current which has flowed during the first constant current control, and determines a state of the first energy storage device based on the capacity of the first energy storage device.

In a third aspect of the embodiment according to the first aspect, the control unit may calculate an internal resistance of the first energy storage device based on a closed circuit voltage of the first energy storage device obtained before or after the first constant current control, based on a closed circuit voltage of the first energy storage device obtained during the first constant current control, and based on the constant current, and the control unit may determine a state of the first energy storage device based on the internal resistance of the first energy storage device.

In a fourth aspect of the embodiment according to the first aspect, when a temperature of the first energy storage device is less than or equal to a threshold, the control unit may perform the first constant current control multiple times while changing the value of the constant current and may determine a state of the first energy storage device based on resistance values of the internal resistance of the first energy storage device, each of which is calculated in each of the multiple times of the first constant current control, respectively.

In a fifth aspect of the embodiment according to the first aspect, the control unit may perform the first constant current control and second constant current control to control the conversion unit such that a constant current flows from the another of the first energy storage device and the second energy storage device to the one of the first energy storage device and the second energy storage device and may determine a state of the first energy storage device based on the voltages of the first energy storage device and the constant currents obtained during the first constant current control and the second constant current control.

In a sixth aspect of the embodiment according to the fifth aspects, the control unit may calculate a capacity of the first energy storage device based on a difference between a state of charge of the first energy storage device corresponding to an open circuit voltage obtained before the second constant current control and a state of charge of the first energy storage device corresponding to an open circuit voltage obtained after the second constant current control and based on the value of the constant current which has flowed during the first constant current control and may determine a state of the first energy storage device based on the capacity of the first energy storage device.

In a seventh aspect of the embodiment according to the fifth or sixth aspect, the control unit may calculate an internal resistance of the first energy storage device based on a closed circuit voltage of the first energy storage device obtained before or after the second constant current control, based on a closed circuit voltage of the first energy storage device obtained during the second constant current control, and based on the constant current, and the control unit may determine a state of the first energy storage device based on the internal resistance of the first energy storage device.

An eighth aspect of the embodiment is an energy storage apparatus including: a first energy storage device (for example, a high capacity battery ES-E or a high power battery ES-P in the embodiment described later); a second energy storage device (for example, a high power battery ES-P or a high capacity battery ES-E in the embodiment described later); a conversion unit (for example, a VCU 101 in the embodiment described later) configured to convert at least one of an output voltage of the first energy storage device and an output voltage of the second energy storage device; a detection unit (for example, a voltage sensor 103p and a voltage sensor 103e and a current sensor 105p and/or a current sensor 105e in the embodiment described later) configured to detect a voltage of the first energy storage device and a current flowing between the first energy storage device and the second energy storage device; and a control unit (for example, an ECU 109 in the embodiment described later) configured to control the conversion unit. The control unit performs constant current control that controls the conversion unit such that a constant current flows from one of the first energy storage device and the second energy storage device to another of the first energy storage device and the second energy storage device, determines a state of the first energy storage device based on the voltage of the first energy storage device and the constant current obtained during the constant current control, and determines a state of the second energy storage device based on the voltage of the second energy storage device and the constant current obtained during the constant current control.

A ninth aspect of the embodiment is a vehicle apparatus having the energy storage apparatus according to any one of the first to eight aspects.

A tenth aspect of the embodiment is a control method performed by an energy storage apparatus including a first energy storage device (for example, a high capacity battery ES-E or a high power battery ES-P in the embodiment described later); a second energy storage device (for example, a high power battery ES-P or a high capacity battery ES-E in the embodiment described later); a conversion unit (for example, a VCU 101 in the embodiment described later) configured to convert at least one of an output voltage of the first energy storage device and an output voltage of the second energy storage device; a detection unit (for example, a voltage sensor 103p or a voltage sensor 103e and a current sensor 105p and/or a current sensor 105e in the embodiment described later) configured to detect a voltage of the first energy storage device and a current flowing between the first energy storage device and the second energy storage device; and a control unit (for example, an ECU 109 in the embodiment described later) configured to control the conversion unit. The control method includes: in the control unit, performing first constant current control that controls the conversion unit such that a constant current flows from one of the first energy storage device and the second energy storage device to another of the first energy storage device and the second energy storage device; and determining a state of the first energy storage device based on the voltage of the first energy storage device and the constant current obtained during the first constant current control.

An eleventh aspect of the embodiment is a control method performed by an energy storage apparatus including a first energy storage device (for example, a high capacity battery ES-E or a high power battery ES-P in the embodiment described later); a second energy storage device (for example, a high power battery ES-P or a high capacity battery ES-E in the embodiment described later); a conversion unit (for example, a VCU 101 in the embodiment described later) configured to convert at least one of an output voltage of the first energy storage device and an output voltage of the second energy storage device; a detection unit (for example, a voltage sensor 103p and a voltage sensor 103e and a current sensor 105p and/or a current sensor 105e in the embodiment described later) configured to detect a voltage of the first energy storage device, a voltage of the second energy storage device, and a current flowing between the first energy storage device and the second energy storage device; and a control unit (for example, an ECU 109 in the embodiment described later) configured to control the conversion unit. The control method includes: in the control unit, performing constant current control that controls the conversion unit such that a constant current flows from one of the first energy storage device and the second energy storage device to another of the first energy storage device and the second energy storage device; determining a state of the first energy storage device based on the voltage of the first energy storage device and the constant current obtained during the constant current control; and determining a state of the second energy storage device based on the voltage of the second energy storage device and the constant current obtained during the constant current control.

According to the first, ninth, and tenth aspects of the embodiment, since the first constant current control that controls the conversion unit such that a constant current flows from one of the first energy storage device and the second energy storage device to another is performed and a state of the first energy storage device is determined based on the voltage of the first energy storage device and the constant current obtained during the first constant current control, the state of the first energy storage device can be determined by using a single conversion unit. Furthermore, with the same first constant current control with a reversed constant current, the state of the second energy storage device can be determined. Further, the first constant current control is performed by performing charging and discharging at a constant current between the first energy storage device and the second energy storage device, and thus there is no indirect constraint on the constant current due to a required drive force as seen in the related art described above, which allows for highly accurate detection of the voltage of the first energy storage device obtained during the first constant current control. Therefore, each state of the energy storage devices can be highly accurately determined.

According to the second aspect of the embodiment, since the capacity of the first energy storage device is calculated based on the accurate voltage of the first energy storage device obtained during the first constant current control, the state of the first energy storage device can be accurately determined based on the capacity.

According to the third aspect of the embodiment, since an internal resistance of the first energy storage device is calculated based on the accurate voltage of the first energy storage device obtained during the first constant current control, the state of the first energy storage device can be accurately determined based on the internal resistance.

According to the fourth aspect of the embodiment, even when the characteristics of the internal resistance against a charge or discharge current of the first energy storage device are not linear because of a low temperature of the first energy storage device, the first constant current control is performed multiple times with different values of current, and thus the state of the first energy storage device can be accurately determined based on the internal resistance obtained multiple times.

According to the fifth aspect of the embodiment, since both the first constant current control and the second constant current control are performed for the first energy storage device and consequently the SOC of each battery after the first constant current control is close to the SOC of each battery before the first constant current, deterioration of each battery can be suppressed and a further voltage of the first energy storage device can be accurately obtained by using both detection during charging and detection during discharging. Therefore, the state of the first energy storage device can be determined in a more accurate manner.

According to the sixth aspect of the embodiment, since both the charge capacity and the discharge capacity are calculated based on voltages of the first energy storage device obtained not only during the first constant current control but also during the second constant current control, the state of the first energy storage device can be determined in a more accurate manner.

According to the seventh aspect of the embodiment, since both an internal resistance against charging and an internal resistance against discharging are calculated based on voltages of the first energy storage device obtained not only during the first constant current control but also during the second constant current control, the state of the first energy storage device can be determined in a more accurate manner.

According to the eighth, ninth, and eleventh aspects of the embodiment, the constant current control that controls the conversion unit such that a constant current flows from one of the first energy storage device and the second energy storage device to the another is performed, a state of the first energy storage device is determined based on the voltage of the first energy storage device and the constant current obtained during the first constant current control, and a state of the second energy storage device is determined based on the voltage of the second energy storage device and the constant current obtained during the same constant current control. Thus, both states of the first energy storage device and the second energy storage device can be determined at the same time by using a single conversion unit. Further, the constant current control is performed by performing charging and discharging at a constant current between the first energy storage device and the second energy storage device, and thus there is no indirect constraint on the constant current due to a required drive force as seen in the related art described above, which allows for highly accurate detection of the voltage of the first energy storage device obtained during the constant current control. Therefore, the states of the two energy storage devices can be determined in a highly accurate manner.

Obviously, numerous modifications and variations of the present invention are possible in light of the above teachings. It is therefore to be understood that within the scope of the appended claims, the invention may be practiced otherwise than as specifically described herein.

What is claimed is:

1. An energy storage apparatus comprising:
   a first energy storage device;
   a second energy storage device;
   a converter to convert at least one of a first voltage output from the first energy storage device and a second voltage output from the second energy storage device;
   a detector to detect the first voltage and a current flowing along a current path between the first energy storage device and the second energy storage device, the detector and the converter each being provided along the current path between the first energy storage device and the second energy storage device; and
   electronic control unit connected to the detector and the converter, the electronic control unit being configured to:
      control the converter to perform a first constant current control in which a first constant current flows along the current path from one of the first energy storage device and the second energy storage device to another of the first energy storage device and the second energy storage device; and
      determine a state of the first energy storage device based on the first voltage and the first constant current while the first constant current control is performed, the state of the first energy storage device is based on at least one of a state of charge of the first energy storage device, a failure state of the first energy storage device, a capacity of the first energy storage device, and an internal resistance of the first energy storage device,
   wherein only a single converter is provided along the current path between the first energy storage device and the second energy storage device.

2. The energy storage apparatus according to claim 1, wherein the electronic control unit calculates the capacity of the first energy storage device based on the first constant current while the first constant current control is performed and a difference between the state of charge of the first energy storage device corresponding to an open circuit voltage of the first energy storage device before the first constant current control is performed and the state of charge of the first energy storage device corresponding to an open circuit voltage of the first energy storage device after the first constant current control is performed, and
   wherein the electronic control unit determines the state of the first energy storage device based on the capacity of the first energy storage device.

3. The energy storage apparatus according to claim 1, wherein the circuitry electronic control unit calculates the internal resistance of the first energy storage device based on an open circuit voltage of the first energy storage device detected before or after the first constant current control is performed, based on a closed circuit voltage of the first energy storage device detected while the first constant current control is performed, and based on the first constant current, and
   wherein the electronic control unit determines the state of the first energy storage device based on the internal resistance of the first energy storage device.

4. The energy storage apparatus according to claim 3, wherein, when a temperature of the first energy storage device is less than or equal to a threshold, the electronic control unit performs multiple first constant current controls with changing a current value of the first constant current, and
   wherein the electronic control unit determines the state of the first energy storage device based on resistance values of the internal resistance of the first energy storage device, each of which is calculated in each of the multiple first constant current controls, respectively.

5. The energy storage apparatus according to claim 1, wherein in addition to the first constant current control, the electronic control unit is configured to control the converter to perform second constant current control in which a second constant current flows from the another of the first energy storage device and the second energy storage device to the one of the first energy storage device and the second energy storage device, and
   wherein the electronic control unit determines a state of the first energy storage device based on the first constant current detected by the detector while the first constant current control is performed, the second constant current detected by the detector while the second constant current control is performed, the first voltage of the first energy storage device detected while the first constant control is performed, and the first voltage of the first energy storage device detected while the second constant current control is performed.

6. The energy storage apparatus according to claim 5, wherein the electronic control unit calculates the capacity of the first energy storage device based on the second constant current detected while the second constant current control is performed and a difference between the state of charge of the first energy storage device corresponding to an open circuit voltage detected before the second constant current control is performed and the state of charge of the first energy storage device corresponding to an open circuit voltage detected after the second constant current control is performed, and
   wherein the electronic control unit determines the state of the first energy storage device based on the capacity of the first energy storage device.

7. The energy storage apparatus according to claim 5, wherein the electronic control unit calculates the internal resistance of the first energy storage device based on an open circuit voltage of the first energy storage device detected before or after the second constant current control is performed, based on a closed circuit voltage of the first energy storage device detected while the second constant current control is performed, and based on the second constant current, and
   wherein the electronic control unit determines the state of the first energy storage device based on the internal resistance of the first energy storage device.

8. A vehicle apparatus comprising the energy storage apparatus according to claim 1.

9. An energy storage apparatus comprising:
   a first energy storage device;
   a second energy storage device;

a converter to convert at least one of a first voltage output from the first energy storage device and a second voltage output from the second energy storage device;

a detector to detect the first voltage and a current flowing along a current path between the first energy storage device and the second energy storage device, the detector and the converter each being provided along the current path between the first energy storage device and the second energy storage device;

an electronic control unit connected to the detector and the converter, the electronic control unit being configured to:

control the converter to perform a constant current control in which a constant current flows along the current path from one of the first energy storage device and the second energy storage device to another of the first energy storage device and the second energy storage device; and determine a state of the first energy storage device based on the first voltage and the constant current while the constant current control is performed, the state of the first energy storage device is based on at least one of a state of charge of the first energy storage device, a failure state of the first energy storage device, a capacity of the first energy storage device, and an internal resistance of the first energy storage device; and determine a state of the second energy storage device based on the second voltage and the constant current while the constant current control is performed, the state of the second energy storage device is based on at least one of a state of charge of the second energy storage device, a failure state of the second energy storage device, a capacity of the second energy storage device, and an internal resistance of the second energy storage device, wherein only a single converter is provided along the current path between the first energy storage device and the second energy storage device.

10. A vehicle apparatus comprising the energy storage apparatus according to claim 9.

11. A control method for an energy storage apparatus, comprising:

using a converter to convert at least one of a first voltage output from a first energy storage device and a second voltage output from a second energy storage device to perform a first constant current control in which a constant current flows along a current path from one of the first energy storage device and the second energy storage device to another of the first energy storage device and the second energy storage device;

detecting the first voltage and the constant current flowing along the current path between the first energy storage device and the second energy storage device; and determining a state of the first energy storage device based on the first voltage and the constant current while the first constant current control is performed, the state of the first energy storage device is based on at least one of a state of charge of the first energy storage device, a failure state of the first energy storage device, a capacity of the first energy storage device, and an internal resistance of the first energy storage device, wherein only a single converter is provided along the current path between the first energy storage device and the second energy storage device.

12. A control method for an energy storage apparatus, comprising:

using a converter to convert at least one of a first voltage output from a first energy storage device and a second voltage output from a second energy storage device to perform a constant current control in which a constant current flows along a current path from one of the first energy storage device and the second energy storage device to another of the first energy storage device and the second energy storage device;

detecting the first voltage, the second voltage, and the constant current flowing along the current path between the first energy storage device and the second energy storage device;

determining a state of the first energy storage device based on the first voltage and the constant current while the constant current control is performed, the state of the first energy storage device is based on at least one of a state of charge of the first energy storage device, a failure state of the first energy storage device, a capacity of the first energy storage device, and an internal resistance of the first energy storage device; and determining a state of the second energy storage device based on the second voltage and the constant current while the constant current control is performed, the state of the second energy storage device is based on at least one of a state of charge of the second energy storage device, a failure state of the second energy storage device, a capacity of the second energy storage device, and an internal resistance of the second energy storage device, wherein only a single converter is provided along the current path between the first energy storage device and the second energy storage device.

* * * * *